(12) United States Patent
Butcka (10) Patent No.: US 11,761,717 B2
(45) Date of Patent: Sep. 19, 2023

(54) HEAT EXCHANGER HEADER FABRICATED WITH INTEGRAL FLANGE USING ADDITIVE METAL PROCESS

(71) Applicant: Hamilton Sundstrand Corporation, Charlotte, NC (US)

(72) Inventor: William W. Butcka, Colchester, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 118 days.

(21) Appl. No.: 17/236,735

(22) Filed: Apr. 21, 2021

(65) Prior Publication Data
US 2021/0333056 A1    Oct. 28, 2021

Related U.S. Application Data

(60) Provisional application No. 63/016,037, filed on Apr. 27, 2020.

(51) Int. Cl.
*F28F 9/02*    (2006.01)
*B33Y 10/00*   (2015.01)
*B33Y 80/00*   (2015.01)
*B33Y 40/20*   (2020.01)

(52) U.S. Cl.
CPC .............. *F28F 9/02* (2013.01); *B33Y 10/00* (2014.12); *B33Y 40/20* (2020.01); *B33Y 80/00* (2014.12)

(58) Field of Classification Search
CPC .......... F28F 9/02; F28F 9/0224; F28F 9/0248; F28F 9/0256; F28F 9/26; B33Y 10/00; B33Y 40/20; B33Y 80/00; F28D 2021/0021
See application file for complete search history.

(56) References Cited

U.S. PATENT DOCUMENTS

| | | | |
|---|---|---|---|
| 7,810,552 B2 | 10/2010 | Slaughter | |
| 9,212,756 B2 | 12/2015 | Kamp et al. | |
| 10,443,959 B2 | 10/2019 | Streeter et al. | |
| 10,513,983 B2 | 12/2019 | Butcher et al. | |
| 2010/0181734 A1 | 7/2010 | Halling | |
| 2018/0345425 A1 | 12/2018 | Caimano et al. | |
| 2019/0024978 A1 | 1/2019 | Moore et al. | |
| 2019/0024988 A1* | 1/2019 | Wilson | F28F 9/0275 |

(Continued)

FOREIGN PATENT DOCUMENTS

| | | |
|---|---|---|
| CN | 109579570 A | 4/2019 |
| EP | 3822079 A1 | 5/2021 |

OTHER PUBLICATIONS

Extended European Search Report dated Sep. 29, 2021, received for corresponding European Application No. 21169312.2, five pages.

(Continued)

*Primary Examiner* — Rick K Chang
(74) *Attorney, Agent, or Firm* — Kinney & Lange, P.A.

(57) ABSTRACT

An additively manufactured header for a heat exchanger includes a header body. The header body includes a base and a top opposite the base. The base is open and configured for connection to a heat exchanger core. The additively manufactured header further includes a tube extending from the top of the header body and a flange formed on the tube. The header body, the tube, and the flange are all additively manufactured together.

16 Claims, 5 Drawing Sheets

(56) References Cited

U.S. PATENT DOCUMENTS

2019/0154345 A1    5/2019  Martinez et al.
2020/0025454 A1    1/2020  Deshpande et al.
2020/0064076 A1    2/2020  Deshpande et al.

OTHER PUBLICATIONS

Parker Hannifin, Metal Seals, Pradifa Technology Division, 18 pages.

* cited by examiner

HEAT EXCHANGER HEADER FABRICATED WITH INTEGRAL FLANGE USING ADDITIVE METAL PROCESS

BACKGROUND

The present disclosure relates to heat exchangers, and in particular, to headers for heat exchangers.

Heat exchangers are often used to transfer heat between two fluids. For example, in aircraft environmental control systems, heat exchangers are used to transfer heat between a relatively hot air source (e.g., bleed air from a gas turbine engine) and a relatively cool air source (e.g., ram air). Heat exchangers include headers, which attach to opposite sides of the heat exchanger core and include an inlet and/or an outlet. Accordingly, hot air and cool air are directed into the heat exchanger to form alternating layers of hot and cool air within the core.

Due to existing structures and manufacturing techniques, known heat exchanger headers have flanges that are welded onto the heat exchanger header. Welding the flange onto the header provides many pitfalls that are frequently difficult to overcome throughout the manufacturing process. For instance, welding the flange onto the header can result in warping of the header, making more difficult the attachment of sub-components to the flange on the header, and making the header more challenging to attach to the heat exchanger core.

SUMMARY

In one aspect of the disclosure, an additively manufactured header for a heat exchanger includes a header body. The header body includes a base and a top opposite the base. The base is open and configured for connection to a heat exchanger core. The additively manufactured header further includes a tube extending from the top of the header body and a flange formed on the tube. The header body, the tube, and the flange are all additively manufactured together.

In another aspect of the disclosure, a method of making a header for a heat exchanger includes forming a header body in a first build direction. The method further includes forming a tube on the header body and forming a flange on the tube. The header body, the tube, and the flange are each formed in a layer-by-layer process.

In another aspect of the disclosure, a method of making a header for a heat exchanger includes providing a plate comprising a build surface and forming a header body on the build surface in a first build direction extending from the plate. The method further includes forming a tube on the header body and forming a flange on the tube. The header body, the tube, and the flange are each formed in a layer-by-layer process.

DETAILED DESCRIPTION

The present disclosure relates to a header for a heat exchanger. The header includes a base, a top side, and a tube extending radially from the top side. The tube has a flange formed thereon. The header, the tube, and the flange are all manufactured using a layer-by-layer additive manufacturing process. The additively manufactured header for the heat exchanger will be described below with reference to FIGS. 1-4B.

Figure 1:
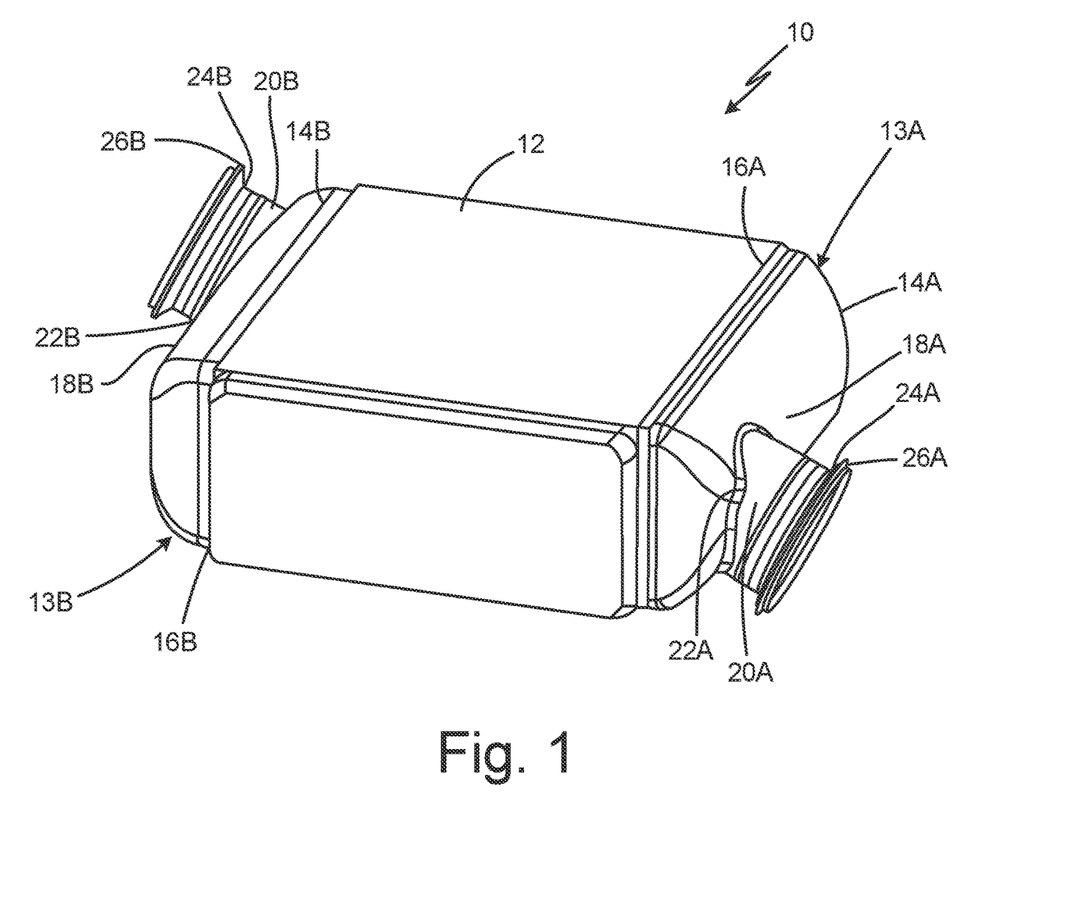
FIG. 1 is a perspective view of a heat exchanger.

FIG. 1 is a perspective view of heat exchanger 10. Heat exchanger 10 includes core 12, header 13A, and header 13B (hereinafter when discussed collectively referred to as "header 13"). Header 13A includes header body 14A, base 16A, top 18A, and tube 20A. Tube 20A includes first end 22A opposite of second end 24A and flange 26A. Header 13A attaches to core 12 and directs airflow into core 12. Base 16A is configured to attach header 13A to core 12. In some embodiments, base 16A is welded to core 12. Header body 14A extends from base 16A to top 18A. Tube 20A extends radially outward from top 18A of header body 14A. First end 22A of tube 20A is contiguous with top 18A of header body 14A. Second end 24A of tube 20A is opposite first end 22A of tube 20A. Flange 26A is formed on second end 24A of tube 20A, such that flange 26A extends radially outward relative to center axis AA (shown in FIG. 3) of tube 20A.

Header 13B include header body 14B, base 16B, top 18B, and tube 20B. Tube 20B includes first end 22B opposite of second end 24B and flange 26B. Header 13B attaches to core 12 and directs airflow into core 12. Base 16B is configured to attach header 13B to core 12. In some embodiments, base 16B is welded to core 12. Header body 14B extends from base 16B to top 18B. Tube 20B extends radially outward from top 18B of header body 14B. First end 22B of tube 20B is contiguous with top 18B of header body 14B. Second end 24B of tube 20B is opposite first end 22B of tube 20B. Flange 26B is formed on second end 24B of tube 20B, such that flange 26B extends radially outward relative to center axis AA of tube 20B.

In operation, airflow is directed into header 13A through an input line (not shown) connected to flange 26A. Airflow travels into tube 20A and from second end 24A of tube 20A to first end 22A of tube 20A and into top 18A of header body 14A. The airflow continues from top 18A of header body 14A to base 16A of header body 14A. Base 16A of header body 14A is coupled to core 12 so that all the airflow within header body 14A flows into core 12. Header 13A is a manifold that spreads and distributes the airflow across an end of core 12. The airflow flows through core 12 and into header 13B. Header 13B is coupled to core 12 so that the airflow within core 12 flows out of heat exchanger 10 through header 13B. Airflow goes from base 16B of header body 14B to top 18B of header body 14B. The airflow then travels from top 18B of header body 14B into first end 22B of tube 20B. The airflow then travels from first end 22B of tube 20B to second end 24B of tube 20B. The airflow leaves tube 20B through an exit line (not shown) attached to flange 26B. In one aspect of the disclosure, the airflow can be the hot airflow of heat exchanger 10. In another aspect of the disclosure, the airflow can be the cold airflow of heat exchanger 10.

Heat exchanger 10, including core 12 and headers 13, can be made from Inconel 725, Inconel 625, aluminum, stainless steel, mild steel, titanium, and/or any other material suitable to make heat exchangers. In one aspect of the disclosure, core 12 and headers 13 can each be made from the same materials. In another aspect of the disclosure, core 12 and headers 13 can each be made from different materials.

Figure 2:
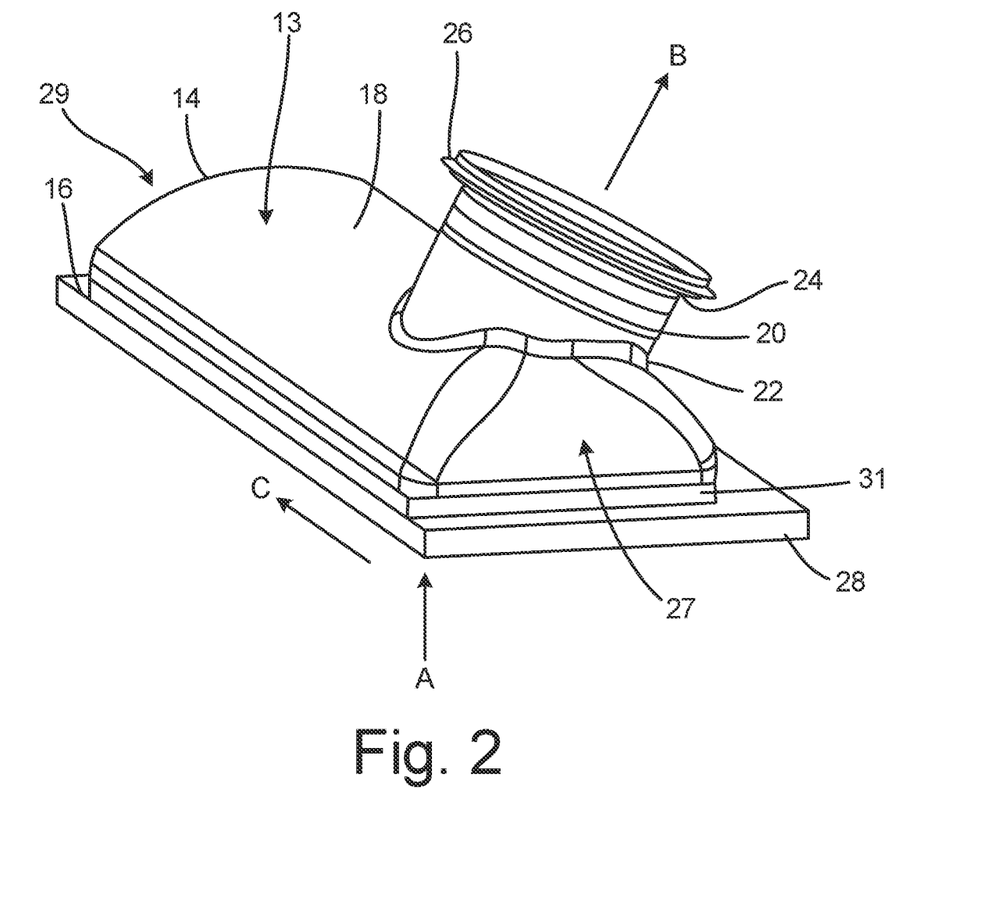
FIG. 2 is a perspective view of a header of the heat exchanger attached to a build plate.

FIG. 2 is a perspective view of header 13 manufactured on plate 28 through a layer-by-layer additive manufacturing process and before header 13 is installed onto heat exchanger 10. Header 13 further includes weld trough 31. Plate 28 supports header 13 throughout the additive manufacturing process. Plate 28 can be pre-formed through any suitable process for creating sheet metal and can be loaded into an additive manufacturing machine prior to the creation of header 13. In other embodiments, plate 28 is additively manufactured in first build direction A in a layer-by-layer process just prior to the formation of header 13. Directly on top of plate 28, header 13 is built layer by layer in first build direction A. Header 13 is built in a layer-by-layer process starting at base 16 and building header 13 toward top 18. Tube 20 is also built by the layer-by-layer process so that first end 22 is contiguous with top 18 of header 13. Tube 20 from first end 22 to second end 24 is built along first build direction A using a layer-by-layer process. Flange 26 is built on second end 24 while continuing in first build direction A. Flange 26 is built outward from the second end 24 of tube 20 relative center axis AA (shown in FIG. 3). In other embodiments, tube 20 and flange 26 can be built in second build direction B, which is angled relative first build direction A and parallel to center axis AA. After completing the build of header 13, plate 28 is machined off header 13 using electrical discharge machining (EDM) or any other cutting or machining technique suitable for disconnecting header 13 from plate 28. Header 13 is then cleaned to remove any scaling from the EDM or any debris from the manufacturing process. Lastly, header 13 is then welded onto core 12 to couple base 16 of header 13 to core 12.

In another aspect of the disclosure, header 13 is built in third build direction C. Header 13 is built in a layer-by-layer process starting at first end 27 of header 13 and building header 13 toward second end 29. Tube 20 is built so that first end 22 is contiguous with top 18 of header body 14. Tube 20 and flange 26 are built together with header body 14 as header 13 is built layer by layer from first end 27 to second end 29 in third build direction C. In this embodiment, plate 28 is also built layer by layer in third build direction C, or plate 28 can be omitted altogether. After header 13 is built, header 13 is cleaned to remove any debris from the manufacturing process. Finally, header 13 is welded onto core 12 to couple base 16 of header 13 to core 12. During the additive manufacture of header 13, weld trough or trough 31 is formed proximate to base 16 on header 13.

Weld trough 31 is formed in an outer surface of header body 14 proximate base 16 that extends a perimeter of base 16. Weld trough 31 varies a thickness of header 13 to increase the weld penetration into header 13 when header 13 is welded onto core 12. In one aspect of the disclosure, weld trough 31 can be a J-groove weld joint. In another aspect of the disclosure, weld trough 31 can be a Bevel-groove, fillet, V-groove, U-groove, or any other suitable joint for welding.

Figure 3:
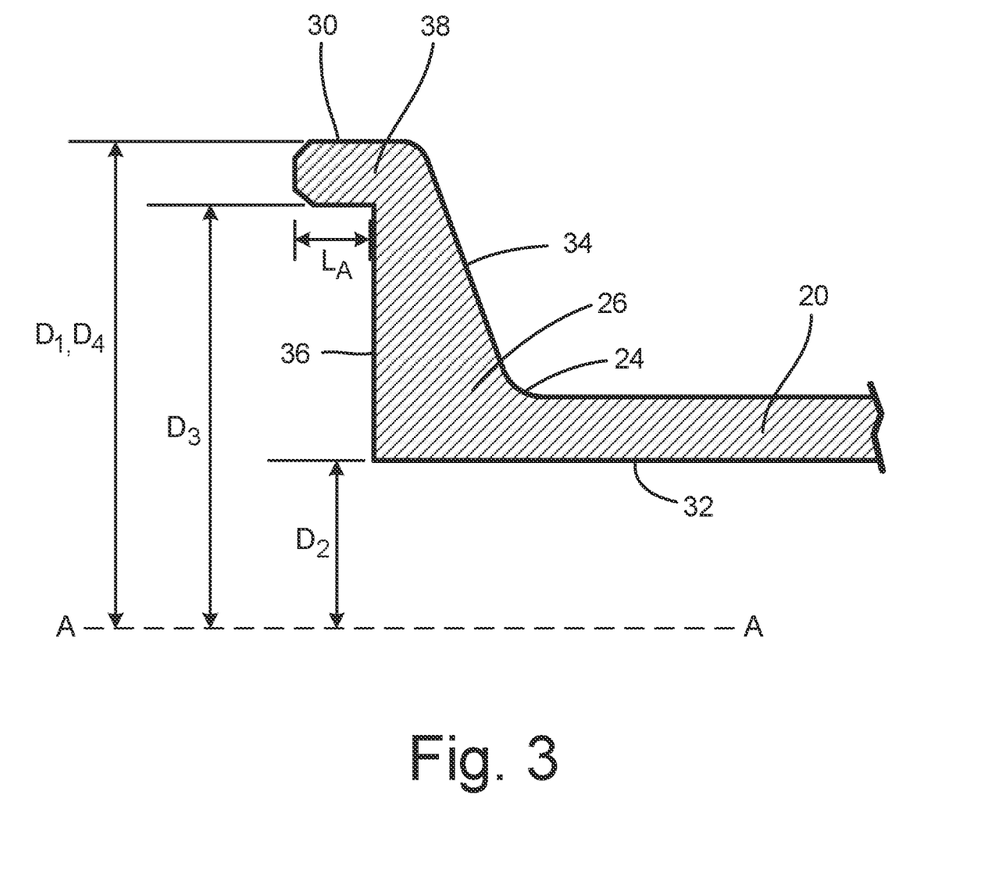
FIG. 3 is a cross-sectional view of a flange on the heat exchanger.

FIG. 3 is a partial cross-section view of flange 26 on tube 20. In FIG. 3. of the disclosure flange 26 can be built in accordance with, for example, SAE AS1895/15. In another aspect of the invention, flange 26 can be built in accordance with, for example, SAE AS1895/14, or any other flange used in connections enabling airflow. In the aspect of the disclosure shown in FIG. 3, flange 26 includes outer surface 30, first diameter D1, inner surface 32, second diameter D2, tapered annular surface 34, flat annular surface 36, and annular protrusion 38. Annular protrusion 38 includes inner diameter D3, outer diameter D4, and axial length $L_A$.

Tapered annular surface 34 extends from second end 24 of tube 20 to outer surface 30 of flange 26. Flat annular surface 36 extends from inner surface 32 of flange 26 toward outer surface 30 of flange 26. Tapered annular surface 34 is axially spaced from flat annular surface 36. Tapered annular surface 34 stiffens flange 26 to help flange 26 resist deformation. Annular protrusion 38 extends perpendicularly from flat annular surface 36 proximate outer surface 30 of flange 26. Annular protrusion 38 extends axial length $L_A$ from flat annular surface 36.

First diameter D1 is the diameter of outer surface 30 of flange 26 revolved around central axis AA. Second diameter D2 is the diameter of inner surface 32 revolved around central axis AA. Flange 26, as depicted in FIG. 3, includes a ratio between second diameter D2 of flange 26 and inner diameter D3 of annular protrusion 38 between 0.55 and 0.95 to ensure enough space on flat annular surface 36 for a ring seal (not shown). Flange 26, as depicted in FIG. 3, further includes a ratio between inner diameter D3 of annular protrusion 38 and outer diameter D4 of annular protrusion 38 between 0.90 and 0.99 to ensure annular protrusion 38 is thick enough to resist deformation and appropriately sized to accommodate an annular protrusion on mating line that is connected to flange 26 (shown below with reference to FIGS. 4A and 4B).

Figure 4A:
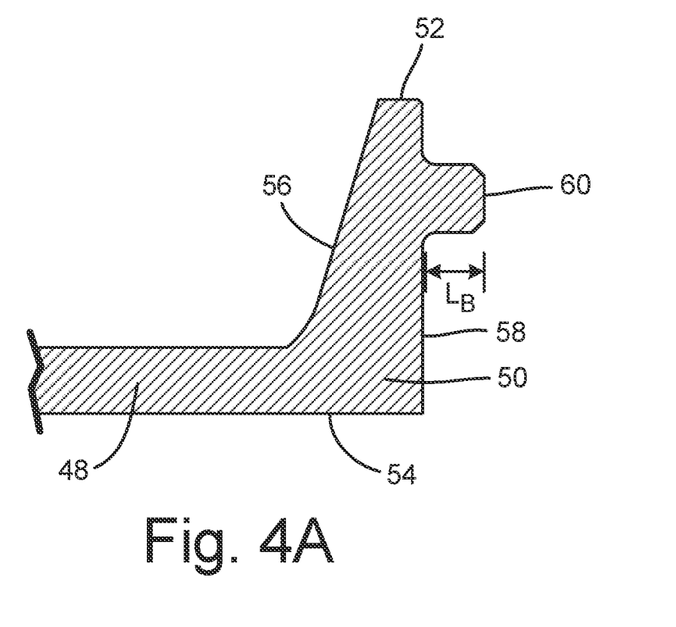
FIG. 4A is a cross-sectional view of an example of a flange on a sub-assembly that attaches to the flange on the heat exchanger.

FIG. 4A is a cross-sectional view of an example of sub-component 48 including flange 50, which attaches to flange 26 on heat exchanger 10. Flange 50 includes outer surface 52, inner surface 54, tapered annular surface 56, flat annular surface 58, and annular protrusion 60. Annular protrusion 58 includes axial length $L_B$.

Tapered annular surface 56 extends from sub-component 48 toward outer surface 52 of flange 50. Flat annular surface 58 extends from inner surface 54 of flange 50 toward outer surface 52 of flange 50. Tapered annular surface 56 is axially spaced from flat annular surface 58. Tapered annular surface 56 stiffens flange 50 to help flange 50 resist deformation. Annular protrusion 60 of flange 50 extends perpendicularly from flat annular surface 58 radially inward from outer surface 52 of flange 50. Annular protrusion 60 extends axial length $L_B$ from flat annular surface 58. Flange 50 is one example of an opposing flange that can connect to flange 26. Flange 50 is coupled to a sub-component, which attaches to flange 26 via flange 50.

Figure 4B:
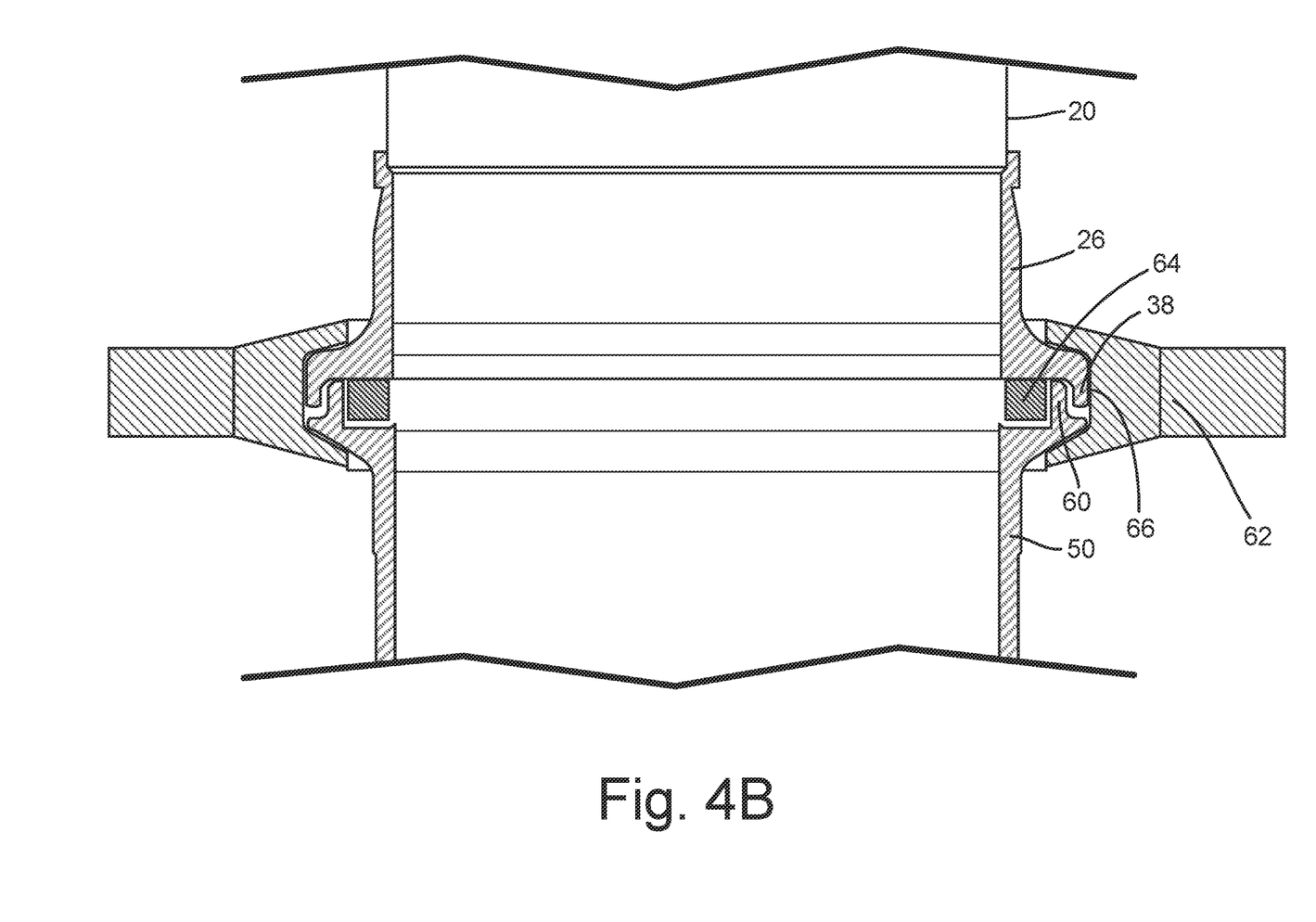
FIG. 4B is a cross-sectional view of the flange from FIG. 3 coupled to the flange of FIG. 4A.

FIG. 4B is a cross-sectional view of flange 26 coupled to flange 50. FIG. 4B includes clamp 62 and seal 64. Clamp 62 includes v-groove 66. As shown in FIG. 4B, flange 26 and flange 50 are coupled together by clamp 62 thereby attaching sub-component 48 to flange 26 and header 13. As flange 26 and flange 50 come together, annular protrusion 60 of flange 50 is radially inward annular protrusion 38 of flange 26. Clamp 62 fastens around flange 26 and flange 50 so that v-groove 66 interacts with tapered annular surface 34 of flange 26 and tapered annular surface 56 of flange 50. As clamp 62 is tightened, v-groove 66 imparts a compressive force on tapered annular surface 34 of flange 26 and tapered annular surface 56 of flange 50 and forces flange 26 and flange 50 together. Seal 64 is located radially inward from annular protrusion 60 of flange 50. As clamp 62 and v-groove 66 force flange 26 and flange 50 together, flat annular surface 36 of flange 26 and flat annular surface 58 of flange 50 compress seal 64. The compressive force between flat annular surface 36 of flange 26, flat annular surface 58 of flange 50, and seal 64 seals the connection between flange 26 and flange 50 to prevent leakage. In other aspects of the disclosure, flange 50 can be additively manufactured on to tube 20 and flange 26 can be used to connect sub-component 48 to flange 50 on tube 20.

Additively manufacturing flange 26 onto tube 20 results in tighter manufacturing tolerances and decreases the failure modes in the manufacturing process. Furthermore, manufacturing header 14, tube 20, and flange 26 with a layer-by-layer additive manufacturing process improves the structural integrity of the assembly. The structural integrity is improved because of the tighter manufacturing tolerances and the decrease in the weld joints necessary to manufacture header 14.

DISCUSSION OF POSSIBLE EMBODIMENTS

The following are non-exclusive descriptions of possible embodiments of the present invention.

In one aspect of the disclosure, an additively manufactured header for a heat exchanger includes a header body. The header body includes a base and a top opposite the base. The base is open and configured for connection to a heat exchanger core. The additively manufactured header further includes a tube extending from the top of the header body and a flange formed on the tube. The header body, the tube, and the flange are all additively manufactured together.

The additively manufactured header of the preceding paragraph can optionally include, additionally and/or alternatively, any one or more of the following features, configurations and/or additional components:

wherein the tube includes a first end at the top of the header body; a second end at a base of the flange; an inner diameter; and an outer diameter;

wherein the flange extends radially outward from the second end of the tube relative a center axis of the tube and includes an outer surface with a first diameter; an inner surface with a second diameter; a tapered annular surface extending from the first end of the tube to the outer surface; a flat annular surface extending from the inner surface toward the outer surface, wherein the flat annular surface is spaced axially from the tapered annular surface; and an annular protrusion extending perpendicularly from the flat annular surface proximate the outer surface;

wherein the annular protrusion includes an inner diameter; an outer diameter, wherein the outer diameter of the annular protrusion is equal to the first diameter of the outer surface of the flange; and an axial length measured from the flat annular surface to a distal end of the annular protrusion;

wherein the ratio between the second diameter of the flange and the inner diameter of the annular protrusion is between 0.55 and 0.95;

wherein a ratio between the inner diameter of the annular protrusion and the outer diameter of the annular protrusion is between 0.90 and 0.99; and/or further including a trough formed in a perimeter of the base of the header body.

In another aspect of the disclosure, a method of making a header for a heat exchanger includes forming a header body in a first build direction. The method further includes forming a tube on the header body and forming a flange on the tube. The header body, the tube, and the flange are each formed in a layer-by-layer process.

The method of the preceding paragraph can optionally include, additionally and/or alternatively, any one or more of the following features, configurations and/or additional components:

further includes providing a plate comprising a build surface; forming the header body on the build surface in the first build direction extending from the plate; cutting the header body from the plate; and cleaning the header body;

further including forming a trough in a perimeter of the header body proximate the build surface;

wherein the tube includes a first end at the header body; a second end at a base of the flange; an inner diameter; and an outer diameter;

wherein the flange extends radially outward relative a center axis of the tube and includes an outer surface with a first diameter; an inner surface with a second diameter; a tapered annular surface extending from the first end of the tube to the outer surface; a flat annular surface extending from the inner surface toward the outer surface, wherein the flat annular surface is spaced axially from the tapered annular surface; and an annular protrusion extending perpendicularly from the flat annular surface proximate the outer surface; and/or wherein the annular protrusion includes: an inner diameter; an outer diameter, wherein the outer diameter of the annular protrusion is equal to the first diameter of the outer surface of the flange; and an axial length measured from the flat annular surface to a distal end of the annular protrusion, wherein a ratio between the second diameter of the flange and the inner diameter of the annular protrusion is between 0.55 and 0.95, and wherein a ratio between the inner diameter and the annular protrusion and the outer diameter of the annular protrusion is between 0.90 and 0.99.

In another aspect of the disclosure, a method of making a header for a heat exchanger includes providing a plate comprising a build surface and forming a header body on the build surface in a first build direction extending from the plate. The method further includes forming a tube on the header body and forming a flange on the tube. The header body, the tube, and the flange are each formed in a layer-by-layer process.

The method of the preceding paragraph can optionally include, additionally and/or alternatively, any one or more of the following features, configurations and/or additional components:

forming a weld trough in a perimeter of the header body proximate the build surface;

wherein the tube comprises: a first end at the header body; a second end at a base of the flange; an inner diameter; and an outer diameter;

wherein the flange extends radially outward relative a center axis of the tube and includes: an outer surface with a first diameter; an inner surface with a second diameter; a tapered annular surface extending from the first end of the tube to the outer surface; a flat annular surface extending from the inner surface toward the outer surface, wherein the flat annular surface is spaced axially from the tapered annular surface; and an annular protrusion extending perpendicularly from the flat annular surface proximate the outer surface;

further comprising: cutting the header body from the plate via Electrical Discharge Machining (EDM); and cleaning the header body;

wherein the tube and the flange are formed in the first build direction; and/or wherein the tube and the flange are formed in a second build direction that is angled from the first build direction.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of making a header for a heat exchanger, wherein the method comprises:
   providing a plate comprising a build surface;
   forming a header body on the build surface in a first build direction extending from the plate, wherein the header body is formed in a layer-by-layer process;
   forming a tube on the header body, wherein the tube is formed in a layer-by-layer process;
   forming a flange on the tube, wherein the flange is formed in a layer-by-layer process; and
   forming a weld trough in a perimeter of the header body proximate the build surface.

2. The method of claim 1, wherein the tube comprises:
   a first end at the header body;
   a second end at a base of the flange;
   an inner diameter; and
   an outer diameter.

3. The method of claim 2, wherein the flange extends radially outward relative a center axis of the tube and comprises:
   an outer surface with a first diameter;
   an inner surface with a second diameter;
   a tapered annular surface extending from the first end of the tube to the outer surface;
   a flat annular surface extending from the inner surface toward the outer surface, wherein the flat annular surface is spaced axially from the tapered annular surface; and
   an annular protrusion extending perpendicularly from the flat annular surface proximate the outer surface.

4. The method of claim 3, wherein the annular protrusion comprises:
   an inner diameter;
   an outer diameter, wherein the outer diameter of the annular protrusion is equal to the first diameter of the outer surface of the flange; and
   an axial length measured from the flat annular surface to a distal end of the annular protrusion,
   wherein a ratio between the second diameter of the flange and the inner diameter of the annular protrusion is between 0.55 and 0.95, and
   wherein a ratio between the inner diameter of the annular protrusion and the outer diameter of the annular protrusion is between 0.90 and 0.99.

5. The method of claim 1 further comprising:
   cutting the header body from the plate via Electrical Discharge Machining (EDM); and
   cleaning the header body.

6. The method of claim 1, wherein the tube and the flange are formed in the first build direction.

7. The method of claim 1, wherein the tube and the flange are formed in a second build direction that is angled from the first build direction.

8. The method of claim 1, wherein the header body comprises:
   a base; and
   a top opposite the base, wherein the base is open and configured for connection to a heat exchanger core;
   wherein the tube extends from the top of the header body.

9. A method of making a header for a heat exchanger, wherein the method comprises:
   providing a plate comprising a build surface;
   forming a header body on the build surface in a first build direction extending from the plate, wherein the header body is formed in a layer-by-layer process;
   forming a tube on the header body, wherein the tube is formed in a layer-by-layer process and wherein the tube comprises:
      a first end at the header body;
      a second end at a base of the flange;
      an inner diameter; and
      an outer diameter; and
   forming a flange on the tube, wherein the flange is formed in a layer-by-layer process and wherein the flange comprises:
      an outer surface with a first diameter;
      an inner surface with a second diameter;
      a tapered annular surface extending from the first end of the tube to the outer surface;
      a flat annular surface extending from the inner surface toward the outer surface, wherein the flat annular surface is spaced axially from the tapered annular surface; and
      an annular protrusion extending perpendicularly from the flat annular surface proximate the outer surface.

10. The method of claim 9 further comprising:
    cutting the header body from the plate via Electrical Discharge Machining (EDM); and
    cleaning the header body.

11. The method of claim 9, wherein the tube and the flange are formed in the first build direction.

12. The method of claim 9, wherein the tube and the flange are formed in a second build direction that is angled from the first build direction.

13. The method of claim 9, wherein the annular protrusion comprises:
    an inner diameter;
    an outer diameter, wherein the outer diameter of the annular protrusion is equal to the first diameter of the outer surface of the flange; and
    an axial length measured from the flat annular surface to a distal end of the annular protrusion.

14. The method of claim 13, wherein a ratio between the second diameter of the flange and the inner diameter of the annular protrusion is between 0.55 and 0.95.

15. The method of claim 13, wherein a ratio between the inner diameter of the annular protrusion and the outer diameter of the annular protrusion is between 0.90 and 0.99.

16. The method of claim 9 further comprising forming a weld trough in a perimeter of the header body proximate the build surface.

* * * * *